W. M. FULTON.
VALVE.
APPLICATION FILED JAN. 4, 1915.
1,176,212.
Patented Mar. 21, 1916.
2 SHEETS—SHEET 1.
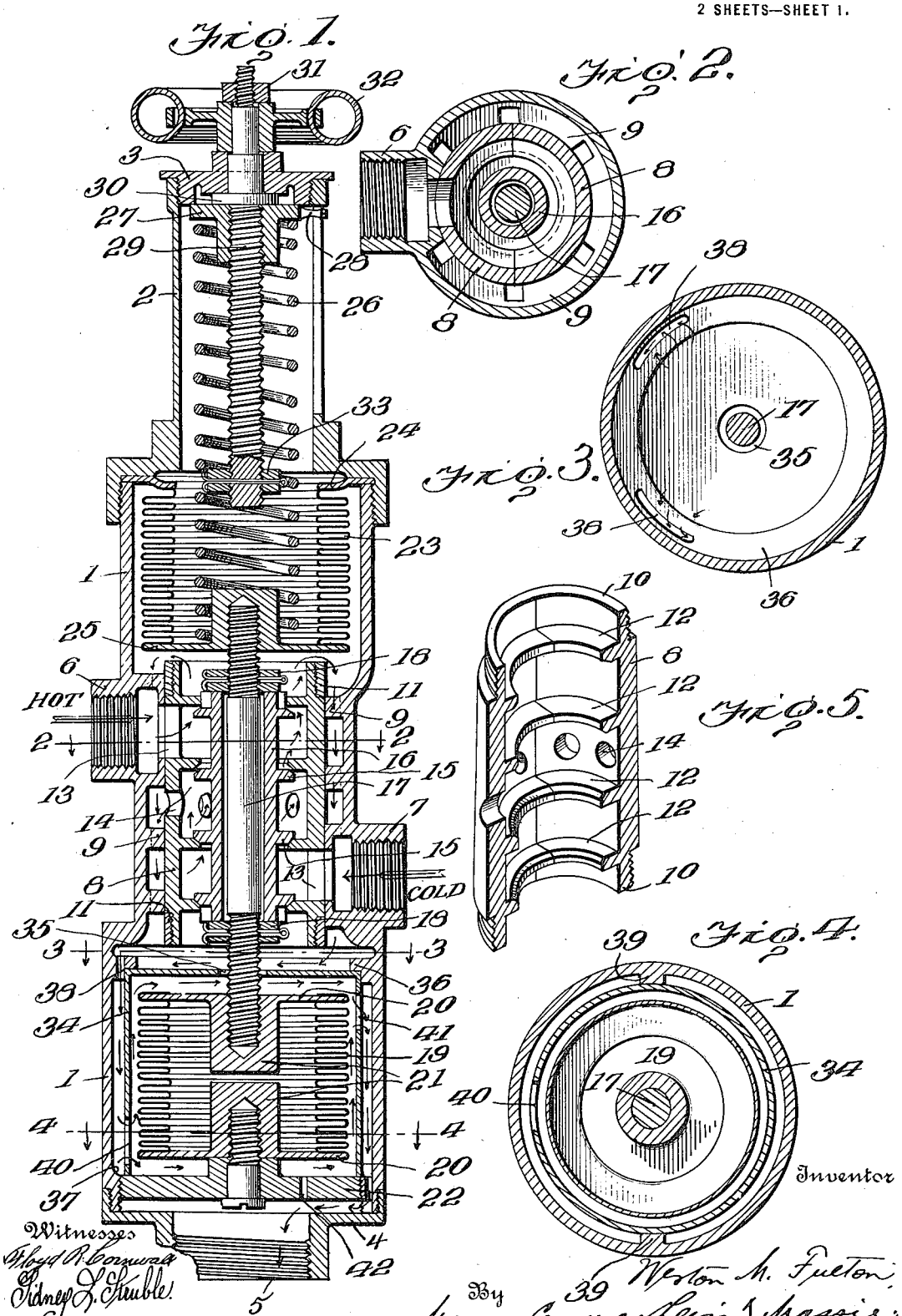

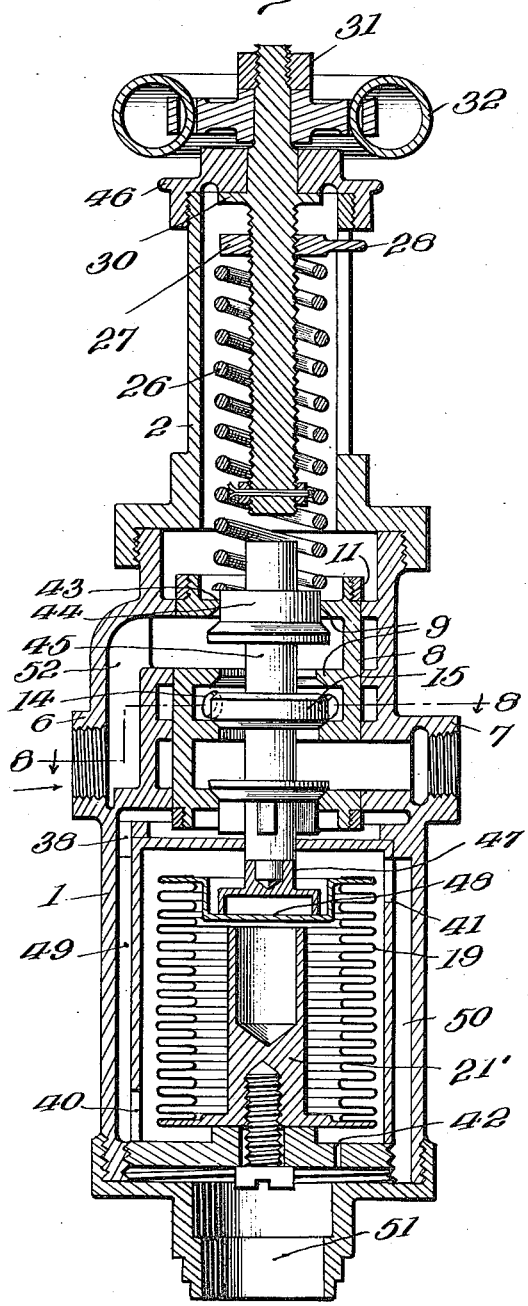
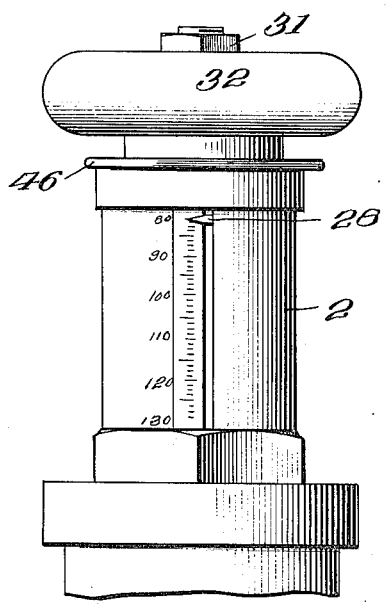
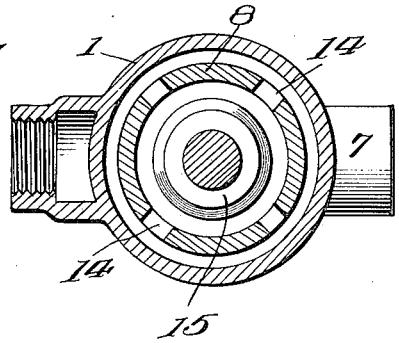

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

VALVE.

1,176,212. Specification of Letters Patent. Patented Mar. 21, 1916.

Original application filed October 27, 1913, Serial No. 797,667. Divided and this application filed January 4, 1915. Serial No. 441.

*To all whom it may concern:*

Be it known that I, WESTON M. FULTON, a citizen of the United States of America, and resident of Knoxville, Tennessee, have invented a new and useful Improvement in Valves, which invention is fully set forth in the following specification.

The present invention relates to improvements in valve structures shown and described, but not now claimed, in my copending application Serial No. 797,667, filed October 27, 1913, entitled "Fluid mixing devices," of which the present application is a division. Matter herein shown and described, but not claimed, relating to the "fluid mixing device" is claimed in the above-mentioned application Serial No. 797,667. As heretofore constructed, these mixing devices are not sufficiently sensitive to maintain the temperature of the mixed fluids with the desired degree of accuracy, and no satisfactory means are provided for indicating accurately the temperature at which the mixture would be maintained by the device nor for readily and quickly adjusting for different temperatures desired in the mixture of fluids discharged.

One of the objects of this invention is to provide a device which controls the temperature of the mixed fluids within very narrow limits and accurately indicates the temperature of the mixture discharged.

A further object is to provide means for adjusting the device to discharge the mixture at a predetermined temperature and means for thoroughly mixing the fluids before discharge.

A further object is to insure a complete circulation of the fluids around the thermo-sensitive element before discharge.

These and other objects will be fully explained in the detailed description.

Temperature controlled fluid mixers find a wide range of application, depending upon the kind of fluids to be mixed and the conditions under which they are to be used. In the following description of my invention I shall describe its use for controlling the temperature of water delivered to bath-tubs and shower-baths where there is a supply of hot and cold water, first, where the mixture is discharged under pressure to the place of use, and second where it is discharged without pressure. It is to be distinctly understood, however, that I do not confine the use of my invention to any particular fluid, as it is generally applicable where fluids at different temperatures are to be mixed to obtain a mixture at a predetermined temperature and to automatically maintain the delivery of the mixture at such temperature.

In order that the invention may be readily understood reference is had to the accompanying drawings which illustrate two mechanical embodiments of the inventive idea and are intended to assist the description of the invention and not to define the limits thereof.

In the drawings:—Figure 1 is a view in longitudinal central vertical section showing the interior construction of a fluid mixer embodying my improvements; Fig. 2 is a transverse sectional view looking downward, taken on line 2—2 of Fig. 1; Figs. 3 and 4 are similar views taken on the lines 3—3 and 4—4 of Fig. 1; Fig. 5 is a sectional detail in perspective; Fig. 6 is a vertical, central sectional view showing a modified form of my improved mixer; Fig. 7 is a perspective view of the upper portion of the casing showing the index and temperature scale; and Fig. 8 is a sectional view taken on the broken line 8—8 of Fig. 6.

Referring to Fig. 1, the device is provided with a cast-metal casing 1 externally threaded at its upper end to receive a housing member 2 adapted to be closed by a screw-plug 3. The lower end of the casing 1 is closed by a screw-cap 4, preferably provided with an internally threaded discharge connection 5. The casing 1 is provided with a hot water inlet connection 6 and a similar cold water inlet connection 7. Within the central portion of the casing 1 is fitted a two-part valve bushing or casing 8 supported by and held away from the walls of the casing 1 by projections 9 arranged in different planes and permitting intercommunication between the annular space between the bushing 8 and walls 1, and the lower part of the casing. This valve bushing is shown in sectional detail in Fig. 5 and is made up of two semi-cylindrical sections slightly tapered to fit a corresponding taper given to the lugs 9. The bushing 8 is provided with screw-threaded reduced ends 10 at its opposite ends for receiving clamping rings 11. On the interior surface of the two halves of the bushing is formed a plurality of ledges 12 which constitute, as shown, two pairs of valve seats with the faces of each pair opposing each other. In each half of the bushing 8 is an opening 13 appearing in Fig. 1. When the bushing is in position in its casing, each opening 13 registers with its corresponding inlet 6 and 7 and permits fluid to enter the spaces, controlled by the two sets of valve seats 12. The bushing 8 is also provided with a plurality of discharge openings 14 located centrally in its walls, permitting free communication of the annular space referred to with the space within the bushing. A plurality of balanced valves 15 integral with or mounted on a hollow valve stem 16 is adapted to coöperate with valve seats 12 to control the relative quantities of fluid to be mixed in passing through the device. This hollow valve stem 16 receives rod 17 which has its opposite ends screw-threaded for receiving locknuts 18 between which the valve stem is held on the rod. For the purpose of guiding the valves to their seats, the upper and lower valves are provided with the usual guide wings, not lettered. A certain amount of play is allowed between the rod 17 and bushing 8 for final assemblage of parts.

The lower part of the casing 1 is somewhat enlarged for receiving a vibratory thermosensitive vessel 19 which contains a volatile liquid, the vapor of which under variations of temperature of the mixed fluid in contact with the vessel causes it to expand and contract. The end walls of this vessel are closed by inelastic plates 20, each provided with an internally projecting screw-threaded hub 21. The lengths of these hubs are such as to prevent too near approach of the end walls and thus protect the sharp bending of the corrugations in the walls of the vessel. The lower end wall 20 rests on a raised portion or seat formed in supporting plate 22 and is made fast thereto by means of a screw which passes through the plate and enters the threaded hub 21. The upper hub 21 receives the lower threaded end of rod 17 carrying the valve stem 16.

The upper end of the casing 1 is closed by a reëntering vibratory wall 23 of the same diameter as vessel 19 and having its upper edge fast to an annular plate 24, the rim of which is flat and is clamped down on the top edge of the casing wall 1 by the under surface of cap 2. The vibratory wall has an inelastic end closure 25 provided with a hub like those on the end walls of vessel 19. The upper screw-threaded end of rod 17 engages the threaded socket in this hub to constitute the upper support for the valve carrying rod 17. External spring pressure is applied to the thermosensitive vessel through rod 17 by means of a spring 26, the lower end of which rests on the end wall 25 of vessel 23 and is kept in place by its hub. The upper end of spring 26 receives a compressing nut 27 provided with a pointer 28 extending through a slot in the wall of cap 2, on one edge of which is marked a temperature scale. Threading nut 27 is a left-hand screw-threaded rod 29 having a smooth round upper portion passing through an opening in plug 3. Rod 29 is held in plug 3 against longitudinal movement by means of a shoulder 30 and a nut 31, under which latter is held the hub of a hand wheel 32 for rotating the rod 29. A stop nut 33 is secured to the end of rod 29 by a cotter pin or by solder, or both, for the purpose of preventing nut 27 riding off the end of rod 29.

In order that the thoroughly mixed fluids may circulate about and come in complete contact with every portion of the thermosensitive element, special means are provided. Within the lower part of the casing 1 and surrounding the thermosensitive element or vessel 21 is located an inverted cup-shaped vessel 34 provided with a central opening 35 in its inverted end wall for admitting the lower threaded end of the valve operating rod 17. The vessel is seated in a recess formed in an annular ledge 36 projecting from the body of the casing 1 and is held in this seated position by aid of base plate 22 which is screw-threaded and is secured in an annular ledge 37 projecting from the wall of the casing 1. The plate 22 is screwed against the end of vessel 34 and holds it against its seat in ledge 36. In the left-hand half of upper ledge 36 (see Fig. 3) are two openings 38, which permit free communication between the annular space around the valve bushing 8 and the space below and confined to one side of the cup 34. The annular space around cup 34 is divided into two spaces by shallow partitions 39 formed in the wall of casing 1. The space on the left of partitions 39 receives the mixed fluids flowing downward and directs them to an opening 40 at the bottom of the cup 34. The space on the right of partitions 39 receives fluids escaping from cup 34 through opening 41 and guides them to the discharge outlet 5. For the purpose of draining the device, a drain-opening 42 is made in plate 22.

The operation of the device thus far described is as follows: Assuming the parts assembled and that the temperature desired to be maintained in the outgoing mixture is 90° F., and that inlet 6 is connected with a source of water above this temperature, and that inlet 7 is connected with a source below this temperature, hand wheel 32 is given a right-hand rotation causing nut 27 to pass downward, compressing spring 26 until index 28 registers with the 90° mark of the temperature scale. This compression of spring 26 overcomes the tension of the vapor in vessel 19 and collapses it, carrying with it rod 17 and valve stem 16 thereby seating the lower set of balanced valves 15 and closing the cold water supply. At the same time the balanced valves 15 of the upper set are moved away from their seats, thereby opening their ports to the hot water supply inlet 6. This water passes through the hot water valve ports filling the space about the vessel 23 and the central space in the valve bushing, and flows downward through the annular space between the casing wall 1 and bushing 8 into the left-hand half of annular space between casing wall 1 and cup 34, thence into the cup through opening 40 and up and around the thermostat vessel 19 and out through opening 41 into the right-hand half of said annular space and finally out through the discharge opening 5. A small portion of this liquid would flow directly around the rod 17 where it passes through the opening in top wall of the cup 34, but this quantity is negligible. As soon as this hot water comes in contact with thermostat 19, the heat expands the vapor therein overcoming the pressure of spring 26 which was set to correspond to a temperature below that of the hot water and thus moves the stem 17 to throttle down the admission of hot water and to open the supply of cold water which mingles within and on the outside of valve bushing 8 with the incoming hot water to reduce its temperature. When the amount of cold water thus admitted and mixed with the hot water brings the temperature of the mixture to 90°, the expansive force of the vapor inside the thermostat vessel 19 will just be sufficient to hold the valves in such position as to admit the proper amounts of hot and cold water to maintain the mixture at 90°. Should, for any reason, too much hot water or too much cold water enter the device, the resultant change of temperature in the outgoing mixture affects the thermostat which readjusts the valves to bring back the temperature of the mixture to 90°. Slight fluctuations in temperature cause a marked degree in expansion of the controlling vessel, thus enabling the temperature of the mixture to be controlled between very narrow limits. Owing to the manner of assembling the valves and valve bushing, the valves can be balanced in pairs on a single stem, and owing to the fact that the diameters of the vessels 19 and 23 are made equal the pressure of the fluid passing through the mixer can neither have a tendency to open nor close the valves or affect in any way the expansion and contraction of the thermostatic vessel 19.

In Figs. 6 to 8, I have illustrated another constructional form of my invention differing from the mixer above described, which is designed to deliver mixed fluids under pressure, whereas in this form of the device the mixed fluids are delivered free from pressure. Where the mixed fluids are delivered under pressure, means are employed in the above-described device for preventing the fluid pressure in the casing affecting the thermostatic element. Where such fluid pressure in the device does not exist or exist to any appreciable extent, such precautionary means may be omitted. In the present form of the invention, the hot and cold fluid inlets 6 and 7 are located in the same level and opposite each other for convenience of connection with the pipe connections of a bath-tub, as these connections are usually arranged parallel, and this provision permits dispensing with bends or elbow fittings. The valve bushing 8 is of the same two-part construction and is supported away from the walls of the casing 1 by projections 9 in the manner previously described, except that the upper opening 43 in the bushing 8 receives an enlarged part 44 of the valve rod 45 which closes the opening and cuts off access of fluid entering the casing from the cap space above the bushing. The valve stem 45 is provided with valves which are balanced in the manner previously described. The housing 2 for the temperature adjusting means is closed by an internally threaded cap 46 and is made smaller than in the first-described construction by reason of the omission of the vibratory vessel. Spring 26 presses directly on the upper enlarged end 44 of the valve rod and the latter rests in a recessed stem of a cup-shaped member 47 seated in a depression in the upper end wall 48 of the thermo-sensitive vessel 19. This construction of the member 47 reduces metallic contact between the wall of the vessel and other working parts and reduces metallic conduction of heat between the vessel and said parts. The hub 21' within vessel 19 is preferably hollowed out to form a tubular extension and serve as a stop to limit the collapse of the corrugated vessel 19 when the desired degree of collapsing movement has been attained. In order that it may be impossible for the fluids flowing through the device to build up pressure inside the mixer, I construct the passages 38, 49, 40, 41 and 50, through which the fluids pass after mixing in the spaces above the thermostatic element, so that they will be greater than the combined areas of the inlets 6 and 7. The outlet port 51 is also made with an area greater than the combined areas of inlets 6 and 7. By this means the expansion and contraction of the thermostatic member 19 is freed from the influence of fluid pressure. In operation, assuming the valves are in the position shown in Fig. 6, hot water enters inlet 6, flows up through channel 52 into a space in the upper part of valve bushing 8, then through the upper open port past the upper side of valve 15, thence through openings 14 in the walls of the bushing and into the annular space between the casing wall and that of the bushing and downward to the passages 38, only one of which appears in the figure. The mixed liquids then follow the course previously described around the thermostatic element and are discharged from the device. The thermostatic element responds to any change of temperature in the mixture above or below that for which it is set by the regulating means and throttles either the hot or cold water supplies to the proper degree to give a mixture of the required temperature in the same manner as in the construction first described.

What is claimed is:—

1. In a device for mixing fluids, a valve casing having inlets, a two-part valve bushing adapted to be slipped into said casing and having openings registering with said inlets, a plurality of valve seats formed on the inner walls of said bushing and a valve stem provided with valves adapted to fit said seats.

2. In a device for mixing fluids, a valve casing having inlets and provided with interior annular projections, a valve bushing in two parts adapted to be slipped into said casing and be supported by said projections and having openings registering with said inlets, and other openings delivering into the space between said casing wall and the bushing, a plurality of valve seats formed on the inner walls of said bushing, and a valve stem provided with valves adapted to fit said seats.

3. In combination, a valve casing, a valve stem provided with a plurality of valves and a two-part valve bushing having valve seats for seating said valves and adapted to be slipped into said casing and be held therein by a taper fit.

4. In combination, a valve casing, a valve stem provided with a plurality of valves, a two-part valve bushing having valve seats for seating said valves, and means for clamping said parts together, said bushing being adapted to be slipped into said casing and to be held therein by a taper fit.

5. In combination, a valve stem having valves, and a valve casing provided with valve seats for seating said valves, said casing being in two parts for admitting said valves within the casing, clamping means holding said parts together, said casing having an external taper to adapt it for insertion in position in a tapered support.

6. In combination, a valve stem having valves, and a valve casing with valve seats for seating said valves, said casing being in two parts for admitting said valves within the casing, and clamping means for holding said parts together.

In testimony whereof I have signed this specification in the presence of two subscribing witnesses.

WESTON M. FULTON.

Witnesses:
H. T. PATTON,
P. J. HOLBROOK.